United States Patent
Kikuchi et al.

(10) Patent No.: US 7,756,636 B2
(45) Date of Patent: Jul. 13, 2010

(54) NAVIGATION DEVICE, NAVIGATION METHOD, AND PROGRAM

(75) Inventors: Shin Kikuchi, Tokyo (JP); Keisuke Onishi, Tokyo (JP); Yusuke Suzuki, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 1082 days.

(21) Appl. No.: 10/543,059

(22) PCT Filed: Sep. 30, 2004

(86) PCT No.: PCT/JP2004/014380

§ 371 (c)(1),
(2), (4) Date: Jul. 21, 2005

(87) PCT Pub. No.: WO2005/033630

PCT Pub. Date: Apr. 14, 2005

(65) Prior Publication Data

US 2006/0149466 A1   Jul. 6, 2006

(30) Foreign Application Priority Data

Oct. 2, 2003   (JP) .............................. 2003-344819

(51) Int. Cl.
*G01C 21/30* (2006.01)
(52) U.S. Cl. ....................................... 701/211; 701/200
(58) Field of Classification Search ................. 701/200, 701/211
See application file for complete search history.

(56) References Cited

U.S. PATENT DOCUMENTS

| | | | |
|---|---|---|---|
| 6,421,606 B1 * | 7/2002 | Asai et al. ................... | 701/209 |
| 2003/0065442 A1 | 4/2003 | Touney | |
| 2003/0109266 A1 * | 6/2003 | Rafiah et al. ................ | 455/456 |

FOREIGN PATENT DOCUMENTS

| | | | |
|---|---|---|---|
| EP | 1 039 429 A1 | | 9/2000 |
| JP | 6-103494 | | 4/1994 |
| JP | 9-115086 | | 5/1997 |
| JP | 10-122888 | | 5/1998 |
| JP | 2001-21373 | | 1/2001 |
| JP | 2002-267487 | | 9/2002 |
| JP | 2002-296070 | | 10/2002 |
| JP | 2002-310720 | | 10/2002 |
| JP | 2002310720 A | * | 10/2002 |
| JP | 2003-21531 | | 1/2003 |
| JP | 2003-214875 | | 7/2003 |

* cited by examiner

*Primary Examiner*—Mark Hellner
*Assistant Examiner*—Helal A Algahaim
(74) *Attorney, Agent, or Firm*—Oblon, Spivak, McClelland, Maier & Neustadt, L.L.P.

(57) ABSTRACT

A navigation apparatus includes: a route acquiring unit that acquires a route that connects a departure place and a destination, the route including a plurality of section routes for which different kinds of transportations are used; a guiding unit that performs a guidance based on the route acquire by the route acquiring unit; and a guidance controller that receives an instruction whether to perform the guidance for each of the section routes, and controls the guiding unit to perform the guidance for a section route for which an instruction to perform the guidance is received.

8 Claims, 8 Drawing Sheets

FIG.3

《LIST OF CANDIDATE ROUTE》
AUGUST 14, 2003
(1) DEPART AT 15:30, ARRIVE AT 16:11
(2) DEPART AT 15:33, ARRIVE AT 16:13
(3) DEPART AT 15:33, ARRIVE AT 16:16
(4) DEPART AT 15:30, ARRIVE AT 16:16
SEARCH AGAIN   SEARCH FOR LAST TRAIN
SET MY NAVIGATION
TO "OUTING MENU"
- - - - - - - - - - -

■FIRST ROUTE
  190   41 MINUTES
15:30 CURRENT POSITION

☐WALK — START ROUTE GUIDANCE — 401
         CHECK ROUTE MAP — 401
15:40 NEZU, EXIT 2
15:43
☐EIDAN CHIYODA LINE 9, 10
CAR NO.
15:49 HIBIYA
15:57
☐EIDAN HIBIYA LINE
16:02 KAMIYACHO, EXIT 1
☐WALK — START ROUTE GUIDANCE — 401
         CHECK ROUTE MAP — 401
16:11  HOME
- - - - - - - - - - -

BREAKDOWN OF FARES
NEZU TO KAMIYACHO
FARE: 190
RETURN TO LIST
- - - - - - - - - - -

■SECOND ROUTE
REQUIRED TIME: 41 MINUTES
   •
   •

FIG.8

⟨LIST OF CANDIDATE ROUTE⟩
AUGUST 14, 2003
(1)DEPART AT 15:30, ARRIVE AT 16:11
(2)DEPART AT 15:33, ARRIVE AT 16:13
(3)DEPART AT 15:33, ARRIVE AT 16:16
(4)DEPART AT 15:30, ARRIVE AT 16:16
SEARCH AGAIN   SEARCH FOR LAST TRAIN
SET MY NAVIGATION
TO "OUTING MENU"
— — — — — — — — — —

■FIRST ROUTE
　190　41 MINUTES
15:30 CURRENT POSITION

□WALK ─ START ROUTE GUIDANCE ──── 401
　　　　└ CHECK ROUTE MAP ──────── 401
15:40 NEZU, EXIT 2
15:43
□EIDAN CHIYODA LINE 9, 10
CAR NO. START ROUTE GUIDANCE ──── 401
15:49 HIBIYA
15:57
□EIDAN HIBIYA LINE
　　　　START ROUTE GUIDANCE ──── 401
16:02 KAMIYACHO, EXIT 1
□WALK ─ START ROUTE GUIDANCE ──── 401
　　　　└ CHECK ROUTE MAP ──────── 401
16:11　HOME
— — — — — — — — — —

BREAKDOWN OF FARES
NEZU TO KAMIYACHO
FARE: 190
RETURN TO LIST
— — — — — — — — — —

■SECOND ROUTE
REQUIRED TIME: 41 MINUTES
　・
　・

FIG.9

| TYPE OF SECTIONS | PROVISION OF GUIDANCE |
|---|---|
| WALK SECTION | PROVIDED |
| SECTION TO USE SUBWAY | NOT PROVIDED |
| SECTION TO USE EXPRESS TRAIN | NOT PROVIDED |
| ⋮ | ⋮ | ns # NAVIGATION DEVICE, NAVIGATION METHOD, AND PROGRAM

TECHNICAL FIELD

The present invention relates to a navigation apparatus, a navigation method, and a program for guiding a user based on a route.

BACKGROUND ART

Conventionally, navigation apparatuses such as a car navigation apparatus have a function of searching for routes from a departure place to a destination. Such navigation apparatuses execute a process for displaying searched routes on maps to be displayed on a display screen or a process for giving voice guidance about turning directions or the like to users so as to guide the users based on the searched routes.

Recently, portable navigation apparatuses have been proposed (see, for example, Patent Literature 1: Japanese Patent Application Laid-Open No. H9-115086). In a portable information device disclosed in Patent Literature 1, users input information about a departure place, boarding stations, trains to use, stations to get off, and a destination, so that a route search process for searching for the routes from the departure place to the boarding stations, and the routes from the stations to get off to the destination is executed.

DISCLOSURE OF THE INVENTION

Problems to be Solved by the Invention

In the conventional car navigation apparatuses, however, the main function is to guide running automobiles along routes, and the guidance continues from the departure place to the destination unless the guidance is canceled by an instruction.

When such a technology of providing guidance based on routes is applied to the portable navigation apparatus disclosed in Patent Literature 1, the users are guided along routes including a departure place, boarding stations, trains to use, stations to get off, and a destination. Since, however, the guidance is not always necessary in all sections, it is sometimes unnecessary to provide voice guidance or the like depending on circumstances.

The present invention has been achieved in order to solve the above problems, and it is an object of the present invention to provide a navigation apparatus, a navigation method, and a program that can provide optimal guidance when plural kinds of transportation means are used and the guidance is provided along a route from a departure place to the destination.

Means to Solve the Problems

To solve the above problems and to achieve the goal, a navigation apparatus according to one aspect of the present invention includes a route acquiring unit that acquires a route that connects a departure place and a destination, the route including a plurality of section routes for which different kinds of transportations are used; a guiding unit that performs a guidance based on the route acquired by the route acquiring unit; and a guidance controller that receives an instruction whether to perform the guidance for each of the section routes, and controls the guiding unit to perform the guidance for a section route for which an instruction to perform the guidance is received.

A navigation apparatus according to another aspect of the present invention includes a route acquiring unit that acquires a route that connects a departure place and a destination, the route including a first section-route for which a first transportation is used and a second section-route for which a second transportation is used; a guiding unit that performs a guidance based on the route acquired by the route acquiring unit; and a guidance controller that receives an instruction whether to perform the guidance for the first section-route, and controls the guiding unit to perform the guidance for a section route for which an instruction to perform the guidance is received, whereas not to perform the guidance for the second section-route.

A navigation method according to still another aspect of the present invention includes acquiring a route that connects a departure place and a destination, the route including a plurality of section routes for which different kinds of transportations are used; receiving an instruction whether to perform the guidance for each of the section routes; and performing the guidance for a section route for which an instruction to perform the guidance is received.

A navigation method according to still another aspect of the present invention includes acquiring a route that connects a departure place and a destination, the route including a first section-route for which a first transportation is used and a second section-route for which a second transportation is used; receiving an instruction whether to perform the guidance for the first section-route; and performing the guidance for a section route for which an instruction to perform the guidance is received, whereas not to perform the guidance for the second section-route.

A computer-readable recording medium according to still another aspect of the present invention stores a program for a navigation apparatus including a guiding unit that performs a guidance based on a route. The program causes a computer to execute the above methods according to the present invention.

EFFECTS DUE TO THE INVENTION

The navigation apparatus according to the present invention provides an optimal guidance when guiding a user along a route from a departure place to a destination using plural kinds of transportation means.

BRIEF DESCRIPTION OF THE DRAWINGS

FIG. 3 is an example of the route searched results displayed on the navigation apparatus;

FIG. 8 is an example of route searched results to be displayed on a navigation apparatus according to a second embodiment of the present invention; and FIG. 9 is a setting table to be set in a navigation apparatus according to a modification of the second embodiment.

DESCRIPTION OF SIGNS

Figure 1:
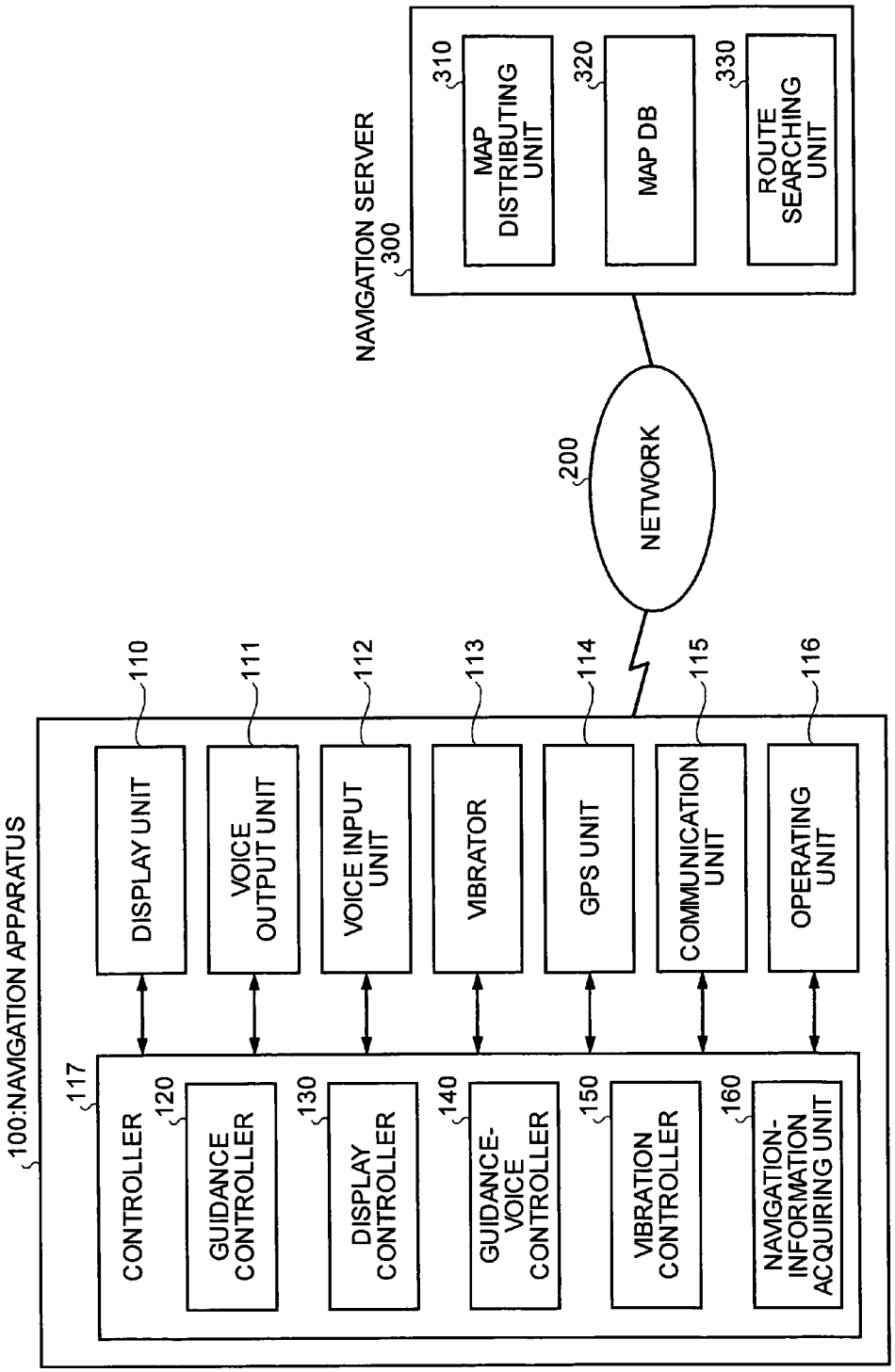
FIG. 1 is a block diagram of a configuration of a network system including a navigation apparatus according to a first embodiment of the present invention.

100 Navigation apparatus
110 Display unit
111 Voice output unit
112 Voice input unit
113 Vibrator
114 GPS unit
115 Communication unit
116 Operating unit
117 Controller
120 Guidance controller
130 Display controller
140 Guidance voice controller
150 Vibration controller
160 Navigation information acquiring unit
200 Network
300 Navigation server
310 Map distributing unit
320 Map database
330 Route searching unit

BEST MODE FOR CARRYING OUT THE INVENTION

Exemplary embodiments of a navigation apparatus, a navigation method, and a program according to the present invention will be explained in detail with reference to the accompanying drawings.

FIG. 1 is a block diagram of a configuration of a network system including a navigation apparatus according to a first embodiment of the present invention. As shown in FIG. 1, the network system has a navigation apparatus 100, a network 200, and a navigation server 300.

An example of the network 200 is a mobile phone network or the Internet, and various data can be exchanged between the navigation apparatus 100 and the navigation server 300 via the network 200.

The navigation apparatus 100 according to the first embodiment is a portable type having a function as a mobile phone, and has a display unit 110, a voice output unit 111, a voice input unit 112, a vibrator 113, a GPS (Global Positioning System) unit 114, a communication unit 115, an operating unit 116, and a controller 117.

The display unit 110 has an LCD (Liquid Crystal Display) or the like, and displays various information, such as a map, based on display data to be supplied from the controller 117. The voice output unit 111 has a speaker, and generates a voice based on voice data to be supplied from the controller 117. The voice input unit 112 has a microphone, and generates voice data corresponding to a sound emitted by a user or the like so as to output the voice data to the controller 117. The voice input unit 112 is used for inputting a voice of a user when the device is used as a telephone.

The vibrator 113 has a vibration motor or the like, and vibrates based on control by the controller 117. A user having the navigation apparatus 100 is informed of incoming calls and various information by this vibration. The GPS unit 114 has a GPS antenna or the like, and outputs position information based on information received from a satellite to the controller 117.

The communication unit 115 has the similar configuration to that of a communication unit of general mobile phones such as antennas, and transmits/receives voice data, map data, and another various data with other communication terminals (mobile phone, web server, etc.) via a mobile phone network of the network 200 based on the control by the controller 117. The operating unit 116 has an input unit such as a ten key, and generates an operating signal according to the contents of user's operation so as to output the signal to the controller 117. For example, the user appropriately operates the operating unit 116, so as to input a guidance executing instruction for instructing guidance along a route.

The controller 117 has storage units such as a CPU (Central Processing Unit), a ROM (Read Only Memory), and a RAM (Random Access Memory), and executes programs stored in the storage units, so as to entirely control the navigation apparatus 100. That is, the controller 117 controls the respective units of the device so that the device serves as a mobile phone.

The controller 117 of the navigation apparatus 100 according to the first embodiment controls the respective units of the device so that the navigation functions such as map display and guidance are implemented. More specifically, the controller 117 has a guidance controller 120, a display controller 130, a guidance voice controller 140, a vibration controller 150, and a navigation information acquiring unit 160.

The display controller 130 generates map display data for displaying maps based on map data distributed from the navigation server 300 so as to output the map display data to the display unit 110. The display controller 130 generates display data for displaying character/graphic information for guidance and another information about navigation so as to output the information to the display unit 110. A map on which a route for guided is displayed, route guidance character information such as "turn right", and the like are displayed on the display unit 110 based on the display data generated by the display controller 130.

The guidance voice controller 140 outputs voice data corresponding to a voice emitted from the voice output unit 111 to the voice output unit 111 at predetermined timing while the route guidance is being provided, so as to generate a guidance voice. For example, at the time when the user of the navigation apparatus 100 is on a spot that is 30 meters short of an intersection at which the user should turn right, the guidance voice controller 140 outputs voice data for generating a guidance voice such as "turn right at next intersection".

The vibration controller 150 drives the vibrator 113 at predetermining timing, so as to vibrate the vibrator 113 in various patterns. The navigation apparatus 100 according to the first embodiment can provide the route guidance to the user according to vibration of various patterns. For example, the vibrator 113 is controlled so as to be vibrated in a vibration pattern that means the right direction, at the time when the user of the navigation apparatus 100 is on the spot that is 30 meters short of an intersection at which the user should turn right (for example, it is vibrated three times per second). Alternatively, the vibrator 113 is controlled so as to be vibrated in a vibration pattern that means the left direction, at the time when the user is on a spot that is 30 meters short of an intersection at which the user should turn left (for example, it is vibrated twice at an interval of two seconds).

According to the first embodiment, the display unit 110, the voice output unit 111, the vibrator 113, the display controller 130, the guidance voice controller 140, and the vibration controller 150 configure the guidance unit that guides the user along a route. The guidance controller 120 controls the guidance by the respective units.

The guidance controller 120 controls the respective units that guide the user along a route so as to provide the guidance. More specifically, the guidance controller 120 controls the units based on current position information acquired from the GPS unit 114 and a selected route for the guidance, so that the guidance such as display of guidance information, guidance by voice, guidance by vibration, and the like is provided.

The guidance controller 120 controls the units so that the guidance based on the route is provided as mentioned above, but it does not control the units so as to provide the guidance for all sections of the route, and accepts the guidance execution instruction for only the walk section of the route. The guidance controller 120 controls the units so that the guidance for the section of the route is provided when the guidance execution instruction is issued.

The navigation server 300 according to the first embodiment specifies a departure place and the destination, so as to make the total route search including not only a walk section but also sections where the public transportation system is used including a departure place, boarding stations (or bus stop), public transportation systems to be used, stations to get off (or bus stop), and the destination. For example, when a certain departure place A and a destination B are specified, a route from the departure place A to a station C (walk), from the station C to a station D (subway, oo line), from the station D to a station E (JR, □□ line), from station the E to a bus stop F, and from the bus stop F to the destination B (walk) is automatically searched. In the walk section, the public transportation means are not used, and transportation means such as bicycles with which the user can move arbitrarily are used.

When the guidance along the searched route from the departure place A to the destination B where plural kinds of transportation means are used is provided, the guidance controller 120 accepts the guidance execution instruction for only the walk sections from A to C and from F to B from the user. The guidance controller 120 makes a control so that voice guidance, vibration guidance, and the like are provided for the instructed sections.

The navigation information acquiring unit 160 accesses to the navigation server 300 via the communication unit 115 and the network 200, and requests transmission of information necessary for the navigation such as map data for displaying a map on the display unit 110 and data representing the searched results of the routes from the departure place to the destination.

More specifically, when a map including a current position is to be displayed, the navigation information acquiring unit 160 periodically acquires information representing the current position from the GPS unit 114, and transmits the request for the transmission of the map data including the current position information to the navigation server 300. When the navigation information acquiring unit 160 has already received the map data including the current position, it does not make the transmission request, and only when it does not have the map data including the current position, it makes the transmission request.

The navigation information acquiring unit 160 transmits a request for the route search including information necessary for the route search such as a departure place (current position can be automatically determined as the departure place, or the user can set the departure place by input), destination, and other search conditions (for example, short required time, low required cost, etc.) to the navigation server 300. The navigation information acquiring unit 160 acquires the map data and the route searched results transmitted from the navigation server 300 according to such requests, so as to supply the data to the display controller 130 or the like.

The navigation apparatus 100 has the above configuration. The navigation server 300 is explained below. The navigation server 300 has a map distributing unit 310, a map database (DB) 320, and a route searching unit 330.

The map database 320 stores map data. Upon reception of a transmission request from the navigation apparatus 100 (or another navigation apparatus), the map distributing unit 310 acquires map data including a spot shown in the current position information included in the transmission request, from the map database. The map distributing unit 310 transmits the map data via the network 200 to the navigation apparatus 100 as a request source.

Upon reception of the route search request from the navigation apparatus 100, the route searching unit 330 searches for a plurality of routes from the departure place to the destination included in the request so as to transmit the route searched results via the network 200 to the navigation apparatus 100 as the request source.

The route searching unit 330 of the navigation server 300 according to the first embodiment suitably combines plural kinds of transportation means such as walk, public transportation systems such as trains and buss, so as to search for an optimal route from the departure place to the destination. As the route search technology using various transportation means, for example, a technology disclosed in Japanese Patent Application Laid-Open No. 2000-258184 can be used.

The network system having the navigation apparatus 100 and the navigation server 300 according to the first embodiment has the above configuration. The operations of the navigation apparatus 100 and the navigation server 300 at the time of executing a navigation method including the route search using the navigation apparatus 100 are explained below with reference to FIGS. 2 to 7.

Figure 2:
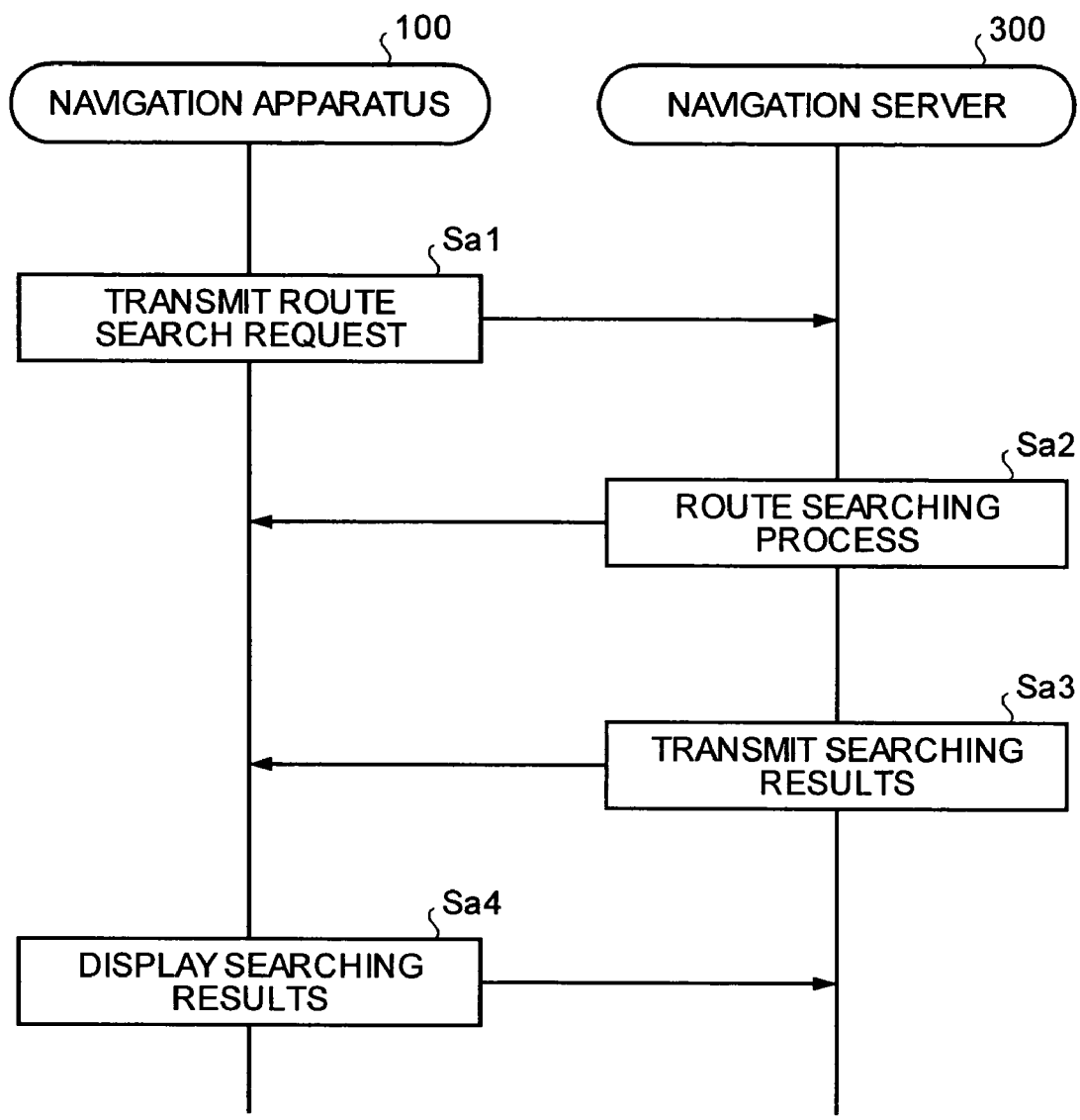
FIG. 2 is a flowchart of a procedure of acquiring route searched results from a navigation server by the navigation apparatus.

As shown in FIG. 2, the user inputs the search conditions such as the departure place and the destination into the navigation apparatus 100 via the operating unit 116 so as to instruct for the route search. Accordingly, the navigation apparatus 100 transmits the route search request including the input search conditions such as the departure place and the destination to the navigation server 300 via the network 200 (step Sa1).

The navigation server 300 that receives the route search request from the navigation apparatus 100 makes the route search according to the search conditions included in the route search request (step Sa2), and transmits the route searched results to the navigation apparatus 100 via the network 200 (step Sa3). In the navigation server 300, the departure place and the destination are specified, so that the route in which sections, using plural kinds of transportation means such as walk and bus, and walk and train, are combined can be searched. The route searched results are transmitted.

In the navigation apparatus 100 that receives the route searched results, the route searched results are displayed on the display unit 110 (step Sa4). One example of the route searched results to be displayed on the display unit 110 of the navigation apparatus 100 is shown in FIG. 3. As shown in FIG. 3, in this example, four routes (a route "depart at 15:30, arrive at 16:11", a route "depart at 15:33, arrive at 16:13", etc.) are displayed in a list as the route searched results, with detailed contents of the respective routes.

FIG. 3 depicts the contents on the screen to be displayed regardless of whether the contents fall within a display screen size of the navigation apparatus 100. That is, when the display screen size is smaller than the display shown in FIG. 3, the contents are scrolled to be displayed, and thus all the contents can be viewed.

The first route in the example shown in FIG. 3 is a route from the departure place to the destination in the order of using walking, subway, and walking. More specifically, the first route includes (1) a walk section (current position to Nezu Station, Exit 2), (2) a section using Chiyoda Line (Nezu Station to Hibiya Station), (3) a section using Hibiya Line (Hibiya Station to Kamiyacho Station), and (4) a walk section (Kamiyacho Station, Exit 1 to home (destination)). The details of the respective sections on the route are displayed.

When the details of the route including the four sections (1) to (4) are displayed, soft buttons 401 such as "Start route guidance" and "Check route map" are displayed for the walk sections (1) and (4). The user operates the operating unit 116 of the navigation apparatus 100 and clicks the soft buttons 401 so as to input the instruction such as "Start route guidance" or "Check route map".

On the other hand, the soft button such as "Start route guidance" is not displayed for the sections using subway. Although not shown in FIG. 3, according to the first embodiment, the soft button such as "Start route guidance" is not displayed for sections using public transportation systems such as buses and trains other than the subway, and the instruction "Start route guidance" is not accepted for these sections.

Figure 4:
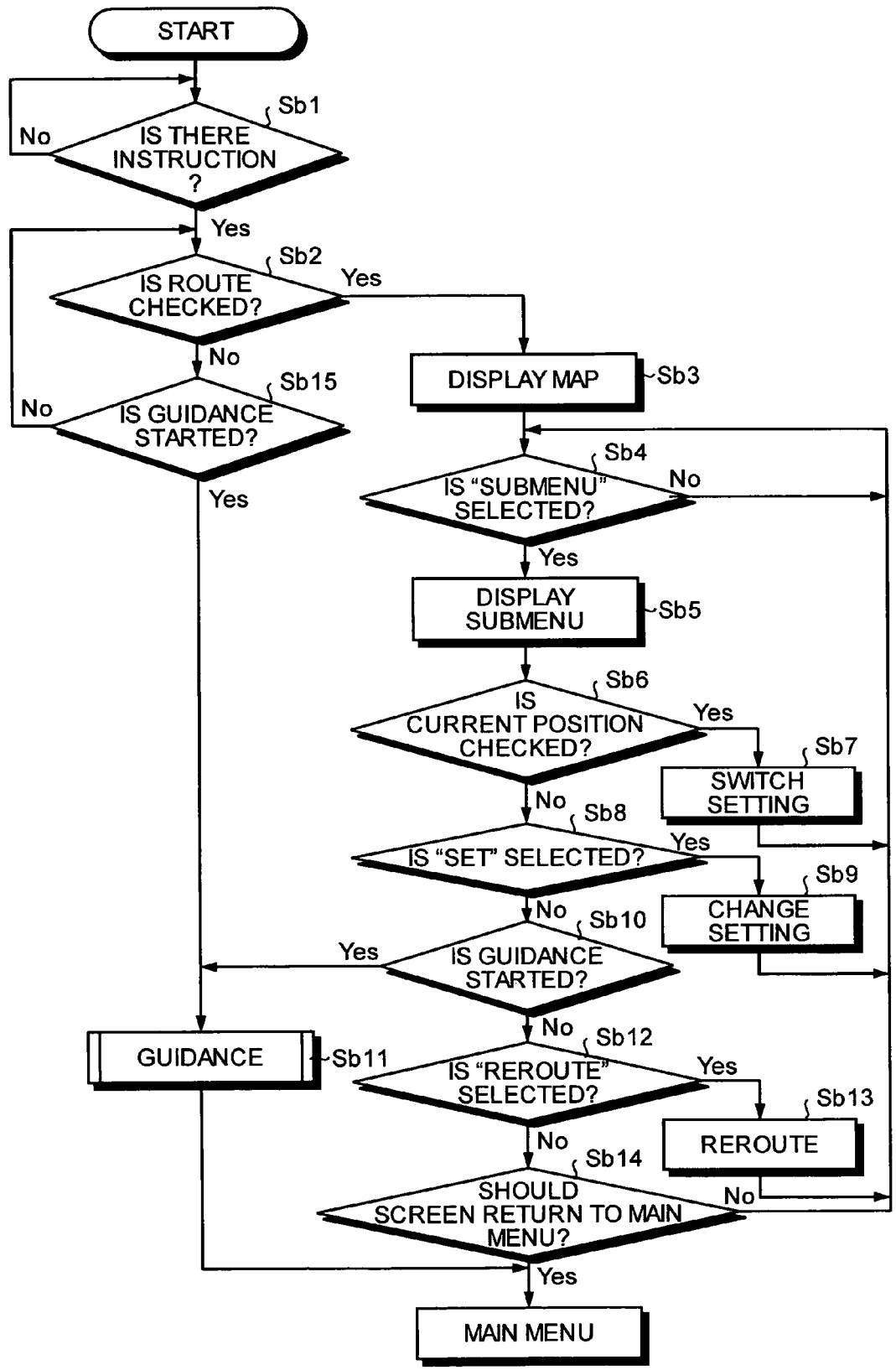
FIG. 4 is a flowchart of a process procedure for guidance or the like based on a route to be provided by the navigation apparatus.

The operation of the navigation apparatus 100 based on an instruction involving a route selection by the user after a plurality of routes are displayed is explained below with reference to FIG. 4. As shown in FIG. 4, the controller 117 determines whether the user issues any instruction via the operating unit 116 (step Sb1).

When the instruction is issued, the controller 117 determines whether "Check route map" is clicked (step Sb2), and when "Check route map" is clicked, the controller 117 makes a control so that the map including a departure spot of the selected route is displayed on the display unit 110 (step Sb3).

Figure 5:
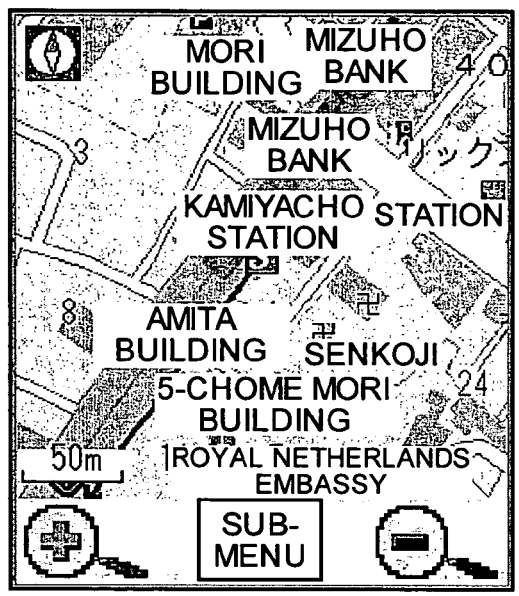
FIG. 5 is an example of a screen to be displayed when the navigation apparatus provides the guidance or the like based on the route.

One example of the display contents on the display unit 110 when "Check route map" is clicked is shown in FIG. 5. As shown in FIG. 5, the map including the departure spot ("S" in FIG. 5) is displayed, and the route from the departure spot (thick line in FIG. 5) is displayed. A "submenu" button is displayed on a lower side of the map.

Figure 6:
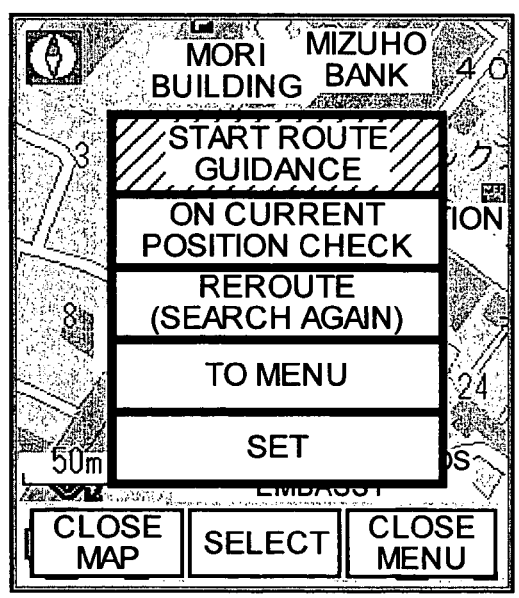
FIG. 6 is an example of a screen to be displaced when the navigation apparatus provides the guidance based on the route.

The controller 117 determines whether the "submenu" is clicked (step Sb4), and when it is determined that the submenu is clicked, the controller 117 makes a control so that a screen shown in FIG. 6 is displayed on the display unit 110. As shown in FIG. 6, soft buttons for instructing commands such as "Start route guidance", "ON current position check", "Set" for various setting, and "Reroute" for instructing another search for the route are displayed on this screen (step Sb5).

The controller 117 carries out the above display and determines whether "ON/OFF current position check" is clicked (step Sb6), and when clicked, switches the state of the current position display that is currently set into a different display state (step Sb7). That is, when the current position is set to be displayed at that moment, the controller 117 switches the state of the display into a state that the current position is not displayed, and when the current position is set not to be displayed, the controller 117 switches the state into the state that the current position is displayed.

The controller 117 determines whether "Set" is clicked (step Sb8), and when "Set" is clicked, displays a screen for the other various settings on the display unit 110. When the user issues an instruction for changing the setting or the like, the controller 117 executes a setting change process (step Sb9).

The controller 117 determines whether "Start route guidance" is clicked (step Sb10), and when "Start route guidance" is clicked, starts the guidance for the selected route (step Sb11). Further, the controller 117 determines whether "Reroute" is clicked (step Sb12), and when "Reroute" is clicked, requests the navigation server 300 to search for another route (step Sb13).

When "Reroute" is not clicked, the controller 117 determines whether an instruction to return to a main menu is issued (step Sb14), and when the instruction is issued, the screen returns to the main menu.

On the other hand, when not "Check route map" but "Start route guidance" is clicked in the state that the display shown in FIG. 3 is provided ("No" at step Sb2) and "Check route map" is clicked, the guidance for the selected route is started (step Sb15).

Figure 7:
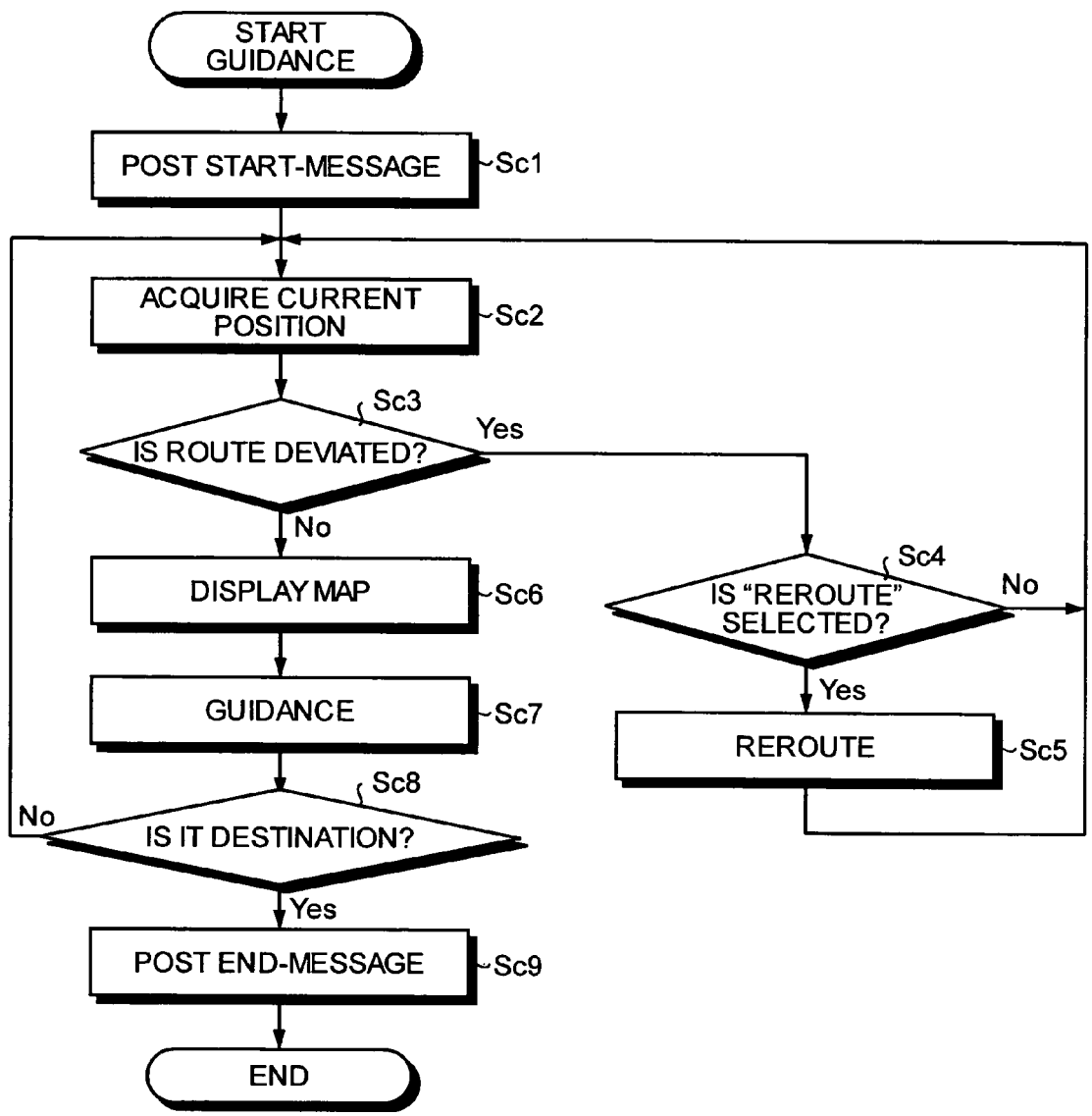
FIG. 7 is a flowchart of a procedure of the guidance process to be executed in the navigation apparatus.

When the instruction to start the route guidance is issued, the controller 117 (guidance controller 120) controls the respective units as explained below, and provides various guidance so that the user can move along the selected route. As shown in FIG. 7, the user is informed of a message about starting of the guidance (step Sc1). Such a message can be given by using a voice, by using display, or by using the both.

When the message about the starting of the guidance is given, the controller 117 acquires the current position information from the GPS unit 114 (step Sc2), and determines whether the current position deviates from a position of the selected route (step Sc3). The deviation from the selected route is detected when a deviation amount is more than a predetermined reference value.

When determined that the current position deviates from the route, the controller 117 determines whether the selected route is to be rerouted (step Sc4), and when the selected route is to be rerouted, requests the navigation server to search for the route where the current position is the departure place (step Sc5). On the other hand, when the selected route is not to be rerouted, the process returns to step Sc2. When there is deviation, a message for urging the user to issue the instruction of reroute may be posted to the user, and the determination on whether the selected route is rerouted may be made based on the instruction. Alternatively, determination may be made depending on whether automatic rerouting at the time when the current position deviates from the route is set.

On the other hand, when determined that the current position does not deviate from the route, the controller 117 executes a process for displaying a map including the current position acquired from the GPS unit 114 (step Sc6). The control of displaying a map including the current position is as described in the explanation of the configuration. The controller 117 makes a control for the route guidance (step Sc7). The control for the route guidance is a control for generating a voice message, posting a notice by vibration, or displaying character information and symbols on the display unit 110 when the user is on a spot that is a predetermined distance short of an intersection at which the user should turn.

The controller 117 determines whether the current position acquired from the GPS unit 114 is the destination (step Sc8), and when the current position is not the destination, the process returns to step Sc2. On the other hand, when the current position is the destination, the controller 117 posts an end message about arrival at the destination to the user (step Sc9), and ends the route guidance process.

The navigation apparatus 100 according to the first embodiment accepts the guidance start instruction for the walk section from the user, and when the guidance start instruction is issued, provides the guidance so that the user can move along the route of the walk section using guiding means such as display, voice, and vibration.

According to the first embodiment, when the user specifies a departure place (current position or an arbitrarily specified spot) and destination so as to make the route search request, the route including combined sections, where plural kinds of transportation means such as walk, and public transportation systems such as trains and buss are used, is posted to the user. The connected route from the departure place to the destination using various transportation means, therefore, can be searched without the need for the user to specify conditions as to what transportation means is used in what section.

According to the first embodiment, the guidance using voice and the like that enables the user to move along one route can be provided, but the instruction for the guidance for the sections other than the walk section (sections where the public transportation systems are used) cannot be provided. That is, guidance execution instructions are not accepted for the route of such sections, and thus the guidance is not given.

While the user is moving along the route of the section using the public transportation system, for example, the route of the section from Awajicho Station to Kasumigaseki Station (Marunouchi Line), namely, the user is on the train, the user does not need the guidance, and voice guidance and vibration guidance in the trains are sometimes inconvenient.

According to the first embodiment, from such a viewpoint, while one route using various transportation means such as walk and public transportation systems can be searched, the instruction for the guidance only for the walk section is accepted so as to provide the guidance only where it is necessary, instead of providing the guidance for all the sections of the route.

When the guidance of the route from a departure place to the destination using various transportation means is provided, the instruction for the guidance for a section where the guidance is effective (according to the first embodiment, the walk section) is accepted. When the user makes the guidance request, the guidance by a voice or the like for that section is provided. The instruction for the guidance for a section where the guidance is not necessary or should not be provided (according to the first embodiment, the section using trains or the like) is not accepted, and thus the guidance is not provided.

With the above arrangement, an optimal guidance along the route using plural kinds of transportation means can be provided, in which the guidance is provided for a necessary section, but is not provided for an unnecessary section.

A navigation apparatus according to a second embodiment of the present invention is explained below. The navigation apparatus according to the second embodiment has the similar configuration to that of the navigation apparatus 100 (see FIG. 1) according to the first embodiment, but the guidance control by the controller 117 is different from the first embodiment. According to the second embodiment, like reference numerals designate like parts, and the explanation thereof is omitted.

According to the first embodiment, the instruction for the guidance only in the route of the walk section is accepted, and when the instruction is issued, the guidance is provided for only the instructed section. The controller 117 of the navigation apparatus according to the second embodiment is different from the first embodiment in that it accepts an instruction as to whether the guidance is provided individually in all the sections using various transportation means such as walk, bus, and train, and makes a control so that the guidance is provided for the instructed section.

According to the second embodiment, similarly to the first embodiment, the route searched results are displayed on the display unit 110 in the navigation apparatus that receives the route searched results. One example of the route searched results to be displayed on the display unit 110 in the navigation apparatus according to the second embodiment is shown in FIG. 8. As shown in FIG. 8, in this example, four routes (a route "depart at 15:30, arrive at 16:11", a route "depart at 15:33, arrive at 16:13", etc.) are displayed in a list as the route searched results, with detailed contents of the respective routes.

According to the second embodiment, similarly to the first embodiment, the routes to be searched and displayed are routes from a departure place to the destination using a plurality of transportation means. More specifically, the first route includes (1) a walk section (current position to Nezu Station, Exit 2), (2) a section using Chiyoda Line (Nezu Station to Hibiya Station), (3) a section using Hibiya Line (Hibiya Station to Kamiyacho Station), and (4) a walk section (Kamiyacho Station, Exit 1 to home (destination)). The details of the respective sections on the route are displayed.

According to the second embodiment, when the details of the route including the four sections (1) to (4) are displayed, the soft buttons 401 such as "Start route guidance" and "Check route map" are displayed for all the walk sections (1), (2), (3), and (4). When the user operates the operating unit 116 of the navigation apparatus 100 so as to click the soft buttons 401, the user can input an instruction such as "Start route guidance" or "Check route map" individually for the respective sections. That is, the user can issue an instruction as to whether the guidance is provided for the respective sections constituting the searched route from the departure place to the destination.

When the "Start route guidance" button is clicked for a certain section, the controller 117 accepts the guidance start instruction, and controls the respective units so that guidance is provided for that section. The contents of the guidance control are similar to those according to the first embodiment (see FIG. 7), and thus the detailed explanation thereof is omitted.

According to the second embodiment, similarly to the first embodiment, when the user specifies a departure place (current position or arbitrarily specified spot) and the destination so as to request for the route search, a route including combined sections using plural kinds of transportation means such as walk, and public transportation systems such as trains and buses is posted to the user.

According to the second embodiment, the instruction as to whether the guidance along the entire route including the sections using plural kinds of transportation means is provided, is not accepted, but the instruction as to whether the guidance is provided for each section is accepted, and thus the guidance is provided only for the instructed section. That is, the user can select whether the guidance is provided for each section, and the guidance can be provided only for a section desired by the user.

For example, in the following case, it is very effective to individually set whether the guidance is provided for each section. When a route such that the user departs from home, gets on a train at the nearest station (including transfer), gets off the train at a station near the destination, and walks to the destination is searched, the user is familiar of the route of the section from home to the nearest station. Therefore, the guidance is not necessary for this section. When the user, however, has never used the route of the section using the trains including transfer (or seldom uses such route), nor the route of the walk section from the station to get off to the destination (or seldom uses such route), the guidance is not necessary for the section from home to the nearest station, but is necessary for the other sections.

The present invention is not limited by the above embodiments and may be variously modified as exemplified in the following modifications.

According to the first embodiment, when the guidance is provided for the route from the departure place to the destination using various transportation means, the guidance instruction for the walking section is accepted, and when the user requests for the guidance, the voice guidance or the like is provided for the walk section. On the other hand, the guidance instruction for the section using the transportation means other than walk is not accepted, and the guidance is not provided. In this manner, the guidance instruction only for the walk section can be accepted, and the guidance for the sections using the other transportation means can be prevented. However, the instruction for the effective guidance for the sections using specified kinds (one or plural) of the transportation means other than walk (the first section) may be accepted, and when the user issues the instruction, the guidance may be provided. Alternatively, the guidance instruction for the sections using transportation means other than specified means where the guidance is not much effective (second section) may not be accepted, so that the guidance is not provided.

According to the second embodiment, the soft buttons such as "Start route guidance" are displayed for the respective sections constituting the entire route from the departure place to the destination, and the instruction from the user is accepted. Alternatively, whether the guidance is provided for each section may be set in advance according to instructions from the user, and when the current position acquired by the GPS unit 114 reaches the section where the guidance is set to be provided, the guidance may be automatically started.

For example as shown in FIG. 9, the user issues an instruction as to whether the guidance is provided for each section using each kind of transportation means in advance, so as to set this instruction contents in a setting table. By referring to the setting table, the controller 117 of the navigation apparatus can make a control so that the guidance is automatically provided when the current position acquired by the GPS unit 114 reaches the section where the guidance is set to be provided.

As shown in the setting shown in FIG. 9, the searched route includes (1) a walk section (current position to Nezu Station, Exit 2), (2) a section using Chiyoda Line (from Nezu Station to Hibiya Station), (3) a section using Hibiya Line (from Hibiya Station to Kamiyacho Station), and (4) a walk section (from Kamiyacho Station, Exit 1 to home (destination)). In this case, the controller 117 of the navigation apparatus operates in the following manner.

Since the guidance is set to be provided for the walk sections in the setting table, when the current position acquired by the GPS unit 114 is on the section from the departure place to Nezu station, the guidance is controlled to be provided. Since the guidance is set to be not provided for the sections using subway, after the current position acquired by the GPS unit 114 reaches the Nezu station, the guidance is not provided for the sections to the Kamiyacho Station (sections (2) and (3)). When the user reaches the Kamiyacho Station, the controller 117 starts the guidance for the section from Kamiyacho Station to home.

With the above setting, the user does not have to perform an operation such as the instruction as to whether the guidance is provided for the respective sections every time when the route is searched. The guidance can be automatically provided for the sections that require the preset guidance.

According to the first and the second embodiments, the navigation apparatus 100 has the mobile phone function, and communicates with the navigation server 300 via the network 200 so as to acquire the map data, the route searched results, and the like. The navigation apparatus, however, can have a storage unit that stores map data and a route search processor that searches for routes, so that the map data can be acquired and the route search process can be executed only by the navigation apparatus.

According to the first and the second embodiments, the CPU of the controller executes the process including the guidance control according to a program stored in the storage unit such as the ROM. A program that makes the computer execute the similar process, however, can be provided to the user via a communication line such as the internet, or such a program can be recorded in a computer readable recording medium such as a CD-ROM (Compact Disc-Read Only Memory) so as to be provided to the user. This process can be constituted as the navigation apparatus that is realized by an exclusive hardware circuit so as to be provided to the user.

INDUSTRIAL APPLICABILITY

As described above, the navigation apparatus, the navigation method, and the program according to the present invention are effective in mobile navigation.

The invention claimed is:

1. A navigation apparatus comprising:
a receiving unit that receives an input for a departure place and a destination;
a transmitting unit that transmits to a retrieving server information for the departure place and the destination accepted by the receiving unit;
a route acquiring unit that acquires from the retrieving server information showing transportations to be used in each of a plurality of section routes to be included in a route that connects the departure place and the destination, the transportations being retrieved from the retrieving server based on the information for the departure place and the destination transmitted by the transmitting unit;
a guiding unit that performs a guidance based on the route; and
a guidance controller that controls the guiding unit to perform the guidance, wherein
the route acquiring unit acquires the information showing transportations for all sections including not only a walk section but also sections where the public transportation system is used using the departure place and the destination without the need for a user to specify conditions as to what transportation is used in the section routes and without the need for a user to specify where the user gets on and off public transportation systems to be used in the section routes, and
the guidance controller controls the guiding unit to perform the guidance for a section route in which the public transportation system is not used as the transportation, when an instruction on whether to perform the guidance in the section route is received and an instruction to perform the guidance is received whereas not to perform the guidance for section routes in which the public transportation system is used.

2. The navigation apparatus according to claim 1, wherein the guidance controller displays soft buttons for issuing the instruction to perform the guidance for each of the section routes in which the public transportation system is not used as the transportation.

3. The navigation apparatus according to claim 1, wherein the section routes in which the public transportation system is not used includes a section route in which a traveling on foot is used as the transportation.

4. The navigation apparatus according to claim 1, wherein:
the guidance controller controls such that voice guidance is not provided when the public transportation system is not used.

5. The navigation apparatus according to claim 1, wherein:
the guidance controller controls such that guidance is not provided when the public transportation system which is a train is used.

6. A navigation method comprising:
receiving an input for a departure place and a destination;
transmitting to a retrieving server information for the departure place and the destination accepted by the receiving;
acquiring from the retrieving server information showing transportations to be used in each of a plurality of section routes to be included in a route that connects the departure place and the destination, the transportations being retrieved from the retrieving server based on the information for the departure place and the destination transmitted by the transmitting;
performing a guidance based on the route; and
controlling, using a controller, the performing of the guidance wherein
the acquiring includes acquiring the information showing transportations for all sections including not only a walk section but also sections where the public transportation system is used using the departure place and the destination without the need for an user to specify conditions as to what transportation is used in the section routes and without the need for an user to specify where the user gets on and off public transportation systems to be used in the section routes, and
the controlling includes controlling the performing of the guidance for a section route in which the public transportation system is not used as the transportation, when an instruction on whether to perform the guidance in the section route is received and an instruction to perform the guidance is received, whereas not to perform the guidance for section routes in which the public transportation system is used.

7. The method according to claim 6, wherein:
the controlling is performed such that voice guidance is not provided when the public transportation system is used.

8. The method according to claim 6, wherein:
the controlling is performed such that guidance is not provided when the public transportation system which is a train is used.

* * * * *